United States Patent [19]

Merz et al.

[11] Patent Number: 4,871,590

[45] Date of Patent: Oct. 3, 1989

[54] REACTIVE, THIXOTROPIC HOT-MELT ADHESIVE ON SILANE BASIS

[75] Inventors: Peter W. Merz, Rüschlikon; Lutz-Dieter Zabel, Birmensdorf, both of Switzerland

[73] Assignee: Sika AG, vorm. Kaspar Winkler & Co., Zurich, Switzerland

[21] Appl. No.: 118,298

[22] Filed: Nov. 6, 1987

[30] Foreign Application Priority Data

Oct. 9, 1987 [CH] Switzerland ................. 3964/87

[51] Int. Cl.$^4$ ............................................. B05D 3/02
[52] U.S. Cl. ...................................... 427/387; 524/1; 524/447; 524/129; 524/179; 524/425; 524/228; 524/227; 524/297; 524/140; 524/145; 524/464; 524/314; 524/310; 524/423; 524/451; 524/439; 524/556; 524/570; 524/606; 524/590; 524/571; 524/507; 264/331.19
[58] Field of Search ............... 524/447, 129, 179, 425, 524/228, 227, 297, 140, 145, 464, 314, 310, 423, 451, 439, 1, 556, 570, 606, 590, 571, 507; 427/387; 264/331.19

[56] References Cited

U.S. PATENT DOCUMENTS

| | | | |
|---|---|---|---|
| 2,814,606 | 11/1957 | Stilmar | 260/42 |
| 2,953,489 | 9/1960 | Young | 154/139 |
| 3,401,141 | 9/1968 | Toth | 260/37 |
| 3,649,541 | 3/1972 | Ingersoll | 252/62.54 |
| 3,711,571 | 1/1973 | Farah | 260/75 |
| 3,763,274 | 10/1973 | Wang et al. | 260/858 |
| 3,829,533 | 8/1974 | Matsui et al. | 260/838 |
| 3,923,926 | 12/1975 | Harada et al. | 260/29.6 |
| 3,957,724 | 5/1976 | Schurb et al. | 525/453 |
| 4,144,219 | 3/1979 | Malloy | 156/331 |
| 4,221,696 | 9/1980 | Cook et al. | 156/334 |
| 4,341,687 | 7/1982 | Ozeki et al. | 524/500 |
| 4,347,338 | 8/1982 | Torii et al. | 525/123 |
| 4,530,976 | 7/1985 | Kordomenos et al. | 525/440 |
| 4,614,766 | 9/1986 | Schimmel et al. | 525/453 |
| 4,622,369 | 11/1986 | Chang et al. | 525/440 |
| 4,628,076 | 12/1986 | Chang et al. | 525/453 |
| 4,778,845 | 10/1988 | Tschan et al. | 524/710 |

FOREIGN PATENT DOCUMENTS

| | | |
|---|---|---|
| 665361 | 6/1963 | Canada . |
| 62-232480 | 10/1987 | Japan . |
| WO81/00718 | 3/1981 | Worle Int. Prop. O. . |

*Primary Examiner*—Melvyn I. Marquis
*Attorney, Agent, or Firm*—Burns, Doane, Swecker & Mathis

[57] ABSTRACT

A thixotropic hot-melt adhesive contains reactive silane groups and is still viscous and plastically moldable after cooling. It contains a mixture of
  at least one thermoplastic material, and
  at least one thixotropic agent,
wherein silane groups are contained either in the thermoplastic material itself or in at least one added silane-based binder.

31 Claims, No Drawings

REACTIVE, THIXOTROPIC HOT-MELT ADHESIVE ON SILANE BASIS

BACKGROUND OF THE INVENTION

1. Field of the Invention

The present invention relates to a reactive, silane-based thixotropic hot-melt adhesive.

Traditionally, hot-melt adhesives (hot melts) are thermoplastic materials, which are heated for their processing in a dispensing gun or in another device to a temperature of 90°–200° C. and are applied as a liquid mass to the substrates to be bonded.

During cooling, the mass solidifies and thus quickly forms a stable bond.

Quick solidification and the absence of water and solvents are the advantages of these hot-melt adhesives, compared with other adhesive systems.

But their thermoplastic behavior is a drawback, because their mechanical and therefore adhesive characteristics are strongly dependent on temperature. At elevated temperature they re-soften, and at lower temperature they tend to become brittle. Thus, they may only be used in a relatively narrow temperature range.

In the last few years, reactive polyurethane hot-melt adhesives have been introduced in the market. They are characterized by an ability to become cross-linked, whereupon they lose their thermoplastic behavior and have good mechanical characteristics over a broad temperature range. Cross-linkage of the reactive isocyanate groups can be achieved with water, especially humidity, or with a hydrogen-activity compound that is liberated by the influence of heat.

The known solvent-free, moisture-hardenable prepolymeric isocyanates are liquid to soft-waxlike at room temperature. Moreover, because of their low green strength and long reaction time, they have only limited applications.

2. Description of the Prior Art

DE-PS 2 401 320 discloses isocyanate-containing hot-melt adhesives, which are composed of:

(a) 20 to 73 percent by weight of a urethane prepolymer having terminal isocyanate groups on both ends;

(b) 2 to 25 percent by weight of a thermoplastic polymer selected from the group consisting of ethylene-vinylacetate copolymers, ethylene-acrylic acid copolymers, ethylene-acrylate copolymers, atactic polypropylene and linear polyethyleneterephthalate polymers; and (c) 25 to 55 percent by weight of a tackifying resin, such as colophonium derivatives or terpene-phenol copolymers.

However, at certain mixing ratios of these components, they tend to be incompatible and cause instability of the molten masses. Also, they have an insufficient resistance to continuous stress. Moreover, their storage stability is sometimes not sufficient.

In DE-OS 3 236 313 there are described reactive hot-melt adhesives which are compatible, stable upon melting, storage stable in the absence of moisture, and which adhere strongly from the outset and have high thermostability. These reactive hot-melt adhesives were developed for the bonding of thermoplastic and duroplastic materials, foam plastics, varnished surfaces, wood, paper, leather, rubber, textiles, metals, etc. They consist of a mixture of:

(a) 20 to 90 percent by weight of a prepolymeric isocyanate, (b) 0 to 75 percent by weight of a thermoplastic polyurethane, and (c) 5 to 50 percent by weight of a low molecular weight synthetic resin selected from the group consisting of ketone resins, ketone-aldehyde condensation resins, and hydrogenation products of acetophenone condensation resins.

These reactive hot-melt adhesives, within the ranges set forth above, have only limited sag resistance during coating (a coating thickness of more than 2 mm may not be guaranteed), are very tacky and string-like, and after cooling are viscous and have poor plastic moldability. Therefore, their use is limited to certain applications.

There shortcomings of the art are overcome by the subject matter disclosed in Swiss patent application no. 1902/86-4, comprising reactive hot-melt adhesives which do not sag during application, and which, after cooling to room temperature, are touchable and plastically moldable. After cross-linkage with water, especially moisture, these adhesives have good mechanical characteristics and are rubbery to viscous elastic independent of the application temperature, i.e., the melting temperature or ambient temperature. Due to their stability or to their resistance to continuous stress during application, many new applications are possible. A particularly promising new application of these adhesives is in the carmaking industry, where they serve as adhesive bondings for windshields, adhesive bondings for plastic strips, etc. Also, they serve as adhesive bondings in the production of marine vessels, e.g., adhesive bondings for wooden parts.

Swiss patent application no. 1902/86-4 also provides a process for the preparation of these reactive hot-melt adhesives. The reactive hot-melt adhesive disclosed therein is preferably viscous, plastic and moldable at room temperature, and contains a mixture of:

at least one thermoplastic material, preferably in an amount from 20 to 90 percent by weight, especially from 50 to 65 percent by weight, at least one binder having reactive isocyanate groups, preferably in an amount from 5 to 40 percent by weight, especially from 15 to 30 percent by weight, and at least one thixotropic agent, preferably in an amount from 3 to 30 percent by weight, especially from 8 to 20 percent by weight, wherein the isocyanate content, relative to the total weight of the hot-melt adhesive, is in the range from 0.01 to 10 percent by weight, preferably in the range from 0.1 to 1 percent by weight, and especially in the range from 0.3 to 0.7 percent by weight.

SUMMARY OF THE INVENTION

Hence, it is a general object of the present invention further to improve the subject matter described in Swiss patent application no. 1902/86-4 and to develop reactive hot-melt adhesives which have no characteristics detrimental to health. This is achieved by replacing the binders having reactive isocyanate groups of the Swiss application by materials having reactive silane groups, which are not so detrimental to health.

The inventive thixotropic hot-melt adhesive contains reactive silane groups and is still viscous, plastic and moldable after cooling. It is characterized in that it contains a mixture of at least one thermoplastic material, and at least one thixotropic agent, wherein reactive silane groups are contained either in the thermoplastic material itself or in at least one added silane-based binder.

Consonant with the disclosure of Swiss Application No. 1902/86-4, the thermoplastic material according to the present invention will preferably be present in an amount from 20 to 90 percent by weight, especially from 50 to 65 percent by weight; the thixotropic agent preferably in an amount from 3 to 30 percent by weight, especially 8 to 20 percent by weight; and the silane-based binder, if present, in an amount from 5 to 40 percent by weight, especially from 15 to 30 percent by weight.

DETAILED DESCRIPTION OF PREFERRED EMBODIMENTS

Preferred embodiments of the inventive hot-melt adhesive are as follows.

According to a first preferred embodiment, the thermoplastic material itself contains silane groups and is a macromolecular material selected from the group consisting of polyamide resins, polyolefins, polyacrylates, polymethacrylates and polyurethane resins.

The polyurethane resins are preferably formed from the following single components:

(A) at least one polyurethane prepolymer having reactive isocyanate groups, and (B) at least one compound containing silane groups, which reacts with the isocyanate groups of the polyurethane prepolymer.

One or more chain extenders may be used if desired.

The polyurethane prepolymers mentioned above at item (A) may be formed from the following single components:

(a) aromatic diisocyanates, such as diphenylmethane-4,4'-diisocyanate, toluene-2,4-diisocyanate, 1,5-naphthalene diisocyanate, 1,3- and 1,4-phenylene-diisocyanate, triphenylmethane-4,4',4''-triisocyanate, polyphenyl-polymethylene-polyisocyanates, (b) aliphatic or cycloaliphatic diisocyanates, such as hexamethylenediisocyanate, dodecane-1,12-diisocyanate, cyclobutane-1,3-diisocyanate, cyclohexane-1,3- and -1,4-diisocyanate, 1-isocyanato-3,3,5-trimethyl-5-isocyanato-methylcyclohexane, hexahydrotoluene-2,4- and -2,6-diisocyanate, hexahydro-1,3- and -1,4-phenyl-diisocyanate, perhydrodiphenylmethane-2,4'- and -4,4'-diisocyanate, (c) polyols having a molecular weight range from 400 to 10,000, preferably from 1,000 to 5,000, such as linear or branched
  polybutadienes,
  polycarbonates,
  polycaprolactones,
  polycaprolactams,
  polyethers, including polyethylene oxides, polypropylene oxides, polybutylene oxides, polystyrene oxides, polyepichlorhydrins, polytetrahydrofurans,
  polyesters, such as condensation products of polyhydric alcohols (e.g., ethylene glycol, 1,2- and 1,3-propylene glycol, 1,4- and 2,3-butylene glycol, 1,6-hexandiol, 1,8-octandiol, glycerin, trimethylol propane, pentaerythritol, chitin, mannitol and sorbitol, methylglycoside, diethylene glycol, polyethylene glycols, dipropylene glycol, polypropylene glycols) with multi-functional carboxylic acids and/or carboxylic acid anhydrides and/or carboxylic esters (e.g. succinic acid, adipic acid, octanedionic acid, azelaic acid, sebacic acid, phthalic acid, isophthalic acid, trimellic acid, phthalic acid anhydride, tetrahydrophthalic acid anhydride, tetrachlorophthalic acid anhydride, glutaric acid anhydride, maleic acid anhydride, fumaric acid, terephthalic acid dimethylester and terephthalic acid-bisglycol ester), each having at least 2 terminal primary and/or secondary OH-groups, (d) short chain diols with terminal primary and/or secondary OH-groups, such as ethylene glycol, propylene glycol, hexamethylene glycol, hexapropylene glycol, diethyleneglycol, and hexaethylene glycol, and (e) cross-linking agents, such as trimethylolpropane, glycerin, hexanetriol, triethanolamine, sorbitol, mannitol, sucrose, ethyleneamine, ethanolamine, hexamethylene amine, and pentaerythritol.

The at least one compound containing silane groups mentioned above at item (B) is selected from the group consisting of
  difunctional alkoxysilanes, including
  (3-aminopropyl)methyldimethoxysilane,
  (3-aminopropyl)methyldiethoxysilane,
  (3-(N-aminoethyl)aminopropyl)methyldimethoxysilane,
  (3-mercaptopropyl)methyldimethoxysilane,
  (3-mercaptopropyl)methyldiethoxysilane, and
  trifunctional alkoxysilanes, including
  (3-aminopropyl)trimethoxysilane,
  (3-aminopropyl)triethoxysilane,
  (3-mercaptopropyl)trimethoxysilane,
  (3-mercaptopropyl)triethoxysilane,
  (3-(N-methylamino)propyl)trimethoxysilane,
  (3-glycidoloxypropyl)trimethoxysilane and compounds containing silane groups and derived from ether interchange of the silane groups of the above mentioned di- or tri-functional alkoxysilanes with at least one hydric compound mentioned above at items (c), (d) and (e) of the description of the polyurethane prepolymers introduced above at item (A).

The optional chain extenders mentioned above are selected from the group consisting of low molecular weight polyhydric compounds, such as ethylene glycol, propylene glycol, hexamethylene glycol, hexapropylene glycol, diethylene glycol, hexaethylene glycol, N-methylethanolamine, N-ethylethanolamine, 2-mercaptoethanol, and sodium chloride complex of p,p-methylene-dianiline, which is transformed at temperatures above 80° C. to the chemically reactive form Caytur 21 $^R$.

According to a second preferred embodiment, the thermoplastic macromolecular material is itself devoid of silane groups, and is selected from the group consisting of polyamide resins, polyolefins, polyacrylates, polymethacrylates and polyurethane resins. These latter are preferably formed from the following single components:

(a) aromatic diisocyanates, such as diphenylmethane-4,4'-diisocyanate, toluene-2,4-diisocyanate, 1,5-naphthalenediisocyanate, 1,3- and 1,4-phenylenediisocyanate, (b) aliphatic or cycloaliphatic diisocyanates, such as hexamethylene-diisocyanate, dodecane-1,12-diisocyanate, cyclobutane-1,3-diisocyanate, cyclohexane-1,3- and -1,4-diisocyanate, 1-isocyanato-3,3,5-trimethyl-5-isocyanatemethylcyclohexane, hexahydrotoluylene-1,4- and -1,6-diisocyanate, hexahydro-1,3- and -1,4-phenyldiisocyanate, perhydro-1,4'- and -4,4'-diphenylmethane-diisocyanate, (c) polyolefins having a molecular weight range from 400 to 10,000, preferably from 1,000 to 5,000, such as linear or branched
polybutadienes,
polycarbonates,
polycaprolactones,
polycaprolactams,
polyethers, including polyethylene oxides, polypropylene oxides, polybutylene oxides, polystyrene oxides, polyepichlorhydrins, polytetrahydrofurans,
polyesters, such as condensation products of multivalent alcohols (e.g., ethylene glycol, 1,2- and 1,3-propylene glycol, 1,4- and 2,3-butylene glycol, 1,6-hexandiol, 1,8-octandiol, glycerin, trimethylolpropane, pentaerythritol, chitin, mannitol and sorbitol, methylglycoside, diethylene glycol, polyethylene glycols, dipropylene glycol, polypropylene glycols) with multi-functional carboxylic acids and/or carboxylic acid anhydrides and/or carboxylic esters (e.g., succinic acid, adipic acid, octanedioic acid, azelaic acid, sebacic acid, phthalic acid, isophthalic acid, trimellic acid, phthalic acid anhydride, tetrahydrophthalic acid anhydride, tetrachlorophthalic acid anhydride, glutaric acid anhydride, maleic acid anhydride, fumaric acid, dimethyl terephthalate and bis-glycol terephthalic acid ester, each having at least 2 terminal primary and/or secondary OH-groups, and
(d) short chain diols with terminal primary and/or secondary OH-groups, such as ethylene glycol, propylene glycol, hexamethylene glycol, hexapropylene glycol, diethyleneglycol and hexaethylene glycol.

In this second embodiment of the invention where the thermoplastic material is itself devoid of silane groups, A silane-based binder must be added. This binder is itself devoid of reactive isocyanate groups, and can be formed from the materials mentioned above at items (A) and (B) and described thereafter.

The thixotropic agent according to the present invention is selected from the group consisting of bentonite, carbon black, silicic acid derivatives, precipitated chalks, polyvinylchloride, urea derivatives and acrylate derivatives.

Additionally, these hot-melt adhesives may have admixed therewith at least one plasticizer, at least one filler and at least one additive, such as adhesion promoters, catalysts, etc.

The at least one plasticizer may be present in an amount from 2 to 30 percent by weight, especially in an amount from 5 to 10 percent by weight. The at least one filler may be present in an amount from 5 to 50 percent by weight, especially in an amount from 8 to 15 percent by weight. The at least one additive may be present in an amount from 0.001 to 5 percent by weight. These percentages refer to the total weight of the hot-melt adhesive.

The plasticizer is selected from the group consisting of phthalates (such as dibutyl-, dioctyl-, dicyclohexyl-, diisooctyl-, diisodecyl-, dibenzyl- or butylbenzylphthalate), phosphates with up to 8 C-atoms in the alkyl group (such as trioctylphosphate), epoxy-containing plasticizers, toluenesulfonamides, chloroparaffins, adipic acid esters and castor oils.

The filler is selected from the group consisting of silicic acid derivatives, gypsum, talcum, active charcoal, metal powder, chalks, kaolins and carbon blacks.

The auxiliary agent or additive is selected from the group consisting of (a) adhesion promoters (especially silane-containing compounds, which may contain additionally at least one reactive group, such as epoxy-, isocyanate-, amino or alkenyl,
(b) dyes and pigments,
(c) conventional polyurethane catalysts (such as lead and/or tin compounds, optionally combined with further polyurethane catalysts, especially tertiary amino catalysts),
(d) UV-absorbing agents and stabilizers (such as phenolic antioxidants and screening agents),
(e) surface active additives (such as emulsifying agents),
(f) flame retardants, and
(g) fungistatic and bacteriostatic active substances.

The inventive process for the preparation of the inventive thixotropic, hot-melt adhesive having reactive silane groups comprises performing one of the following procedures under moisture-free conditions:

(a) a thermoplastic material containing reactive silane groups is provided or prepared in situ, before or after the addition of further components, and there is then homogeneously added a thixotropic agent at the softening point of the thermoplastic material; or (b) at least one material containing isocyanate groups and silane groups is mixed with at least one thixotropic agent, and there is then added at least one compound which is at least hihydric, and the isocyanate groups are reacted in situ; or (c) a thermoplastic material devoid of silane groups is provided or prepared in situ, and there is then homogeneously added, at the softening point of the thermoplastic material, the silane-based binder devoid of reactive isocyanate groups and the thixotropic agent; and the mixtures prepared according to the above-mentioned variations (a) to (c) are then cooled to ambient temperature.

The inventive thixotropic, hot-melt adhesive having reactive silane groups, may be used for bonding and/or sealing one or more materials of the same or different origin to a composite.

Specifically, the materials to be bonded and/or to be sealed are selected from the group consisting of any glass, especially glass plates for use in automotive vehicles, composite glass plates, front walls of glass, any metal, which may be varnished, metallized or otherwise coated and/or pretreated, e.g. bodies of automotive vehicles, any metal alloy, which may be varnished, metallized or otherwise coated and/or pretreated, e.g., bodies of automotive vehicles, any plastic, any construction material, especially stones, concrete, mortar, road pavings, and any wood.

The hot-melt adhesive may be applied at the desired location on the materials to be bonded and/or to be sealed by means of a processing apparatus, such as by means of a cartridge. The cartridge is heatable or has been prewarmed. Alternatively, a hot-melt adhesive-application apparatus may be used at a temperature which is suitable for the applications and which is near the softening point of the adhesive.

It is envisioned that the hot-melt adhesive will be applied to the materials to be bonded and/or to be sealed in the form of an adhesive profile at ambient temperature.

When the adhesive profile has the form of a cord or of a ribbon, there may be incorporated into the cord or the ribbon a thread or a screen of any material, to impart dimensional stability thereto.

Beside the direct application at the softening temperature this reactive hot-melt adhesive may be shaped at elevated temperature, for instance, with the aid of an extruder, to a profile of any shape, such as a cord, a ribbon, etc.

For bonding, these preformed cords may be applied without the use of machines by manual placing and, compared to expenditures with paste-like materials, is cheaper, safer, higher in quality, quicker and cleaner.

These reactive cords may be spirally wound and may be storably packed in an aluminum bag as a water vapor barrier, and thus may be used in the Do-it-yourself-market.

The following examples shall illustrate the invention. The parts mentioned herein are by weight.

EXAMPLE 1

1. Description of the preparation of the polyurethane thermoplastic material

To a mixture of 2400 parts of a poyoxypropylene etherdiol of molecular weight 2000, and 580 parts of diisodecylphthalate, there is added and suspended at room temperature 641.8 parts of diphenylmethane-4,4'-diisocyanate. The resultant suspension is heated to a temperature of 80° C. with stirring and with the exclusion of moisture, whereby the crystalline diphenylmethane-4,4'diisocyanate is dissolved.

After about 150 minutes there ar added 114.1 parts of 1,4-butanediol, and the reaction mixture after a temperature increase to about 100° C. is stirred for about 1 hour to homogenize the isocyanate content.

2. Description of the preparation of the reactive hot-melt adhesive

At a temperature of 100° C. there were added successively to the above-mentioned thermoplastic material 1100 parts of a silane-based binder, which is composed of polyoxypropylene ether diol of the molecular weight 2000 and diphenylmethane-4,4'-diisocyanate having an isocyanate content of 1.0%, blocked with 55 parts DYNASILANE 1110, (3-(N-methylamino)propyl)-trimethoxysilane, and 490 parts of carbon black, dried at a temperature of 130° C., and 4.8 parts of NIAX D 22 (dibutyl-tin dilaurate). The resultant mass is not stringy; rather, at the preparation temperature it is slightly tacky and does not sag. At room temperature, it is readily touchable and plastically moldable.

The following analytical data were obtained after a two weeks' storage of the mass at a temperature of 23° C. and a 50% relative humidity:

| | | |
|---|---|---|
| Shore hardness A | 30 | (DIN 53505) |
| tensile strength [N/mm$^2$] | 2.2 | (DIN 53504) |
| breaking elongation [%] | 350 | (DIN 53504) |
| breaking stress [N/mm$^2$] | 2.2 | (DIN 53504) |
| further breaking strength [N/mm$^2$] | 6.2 | (DIN 53515) |
| open lying time of the beads | about ½ hour | |
| use temperature | −40° C. to +90° C. (temporarily up to +150° C.) | |

EXAMPLE 2

In a mixture of 2400 parts of a polyoxypropylene etherdiol of molecular weight 2000, and 580 parts of diisodecylphthalate, there was suspended at room temperature 641.8 parts of diphenylmethane-4,4'-diisocyanate. The resultant suspension is heated to a temperature of 80° C. with stirring and with the exclusion of moisture, whereby the crystalline diphenylmethane-4,4'-diisocyanate is dissolved.

After about 150 minutes there was added 97.3 parts of 1,4-butanediol, and the reaction mixture after a temperature increase to about 100° C. was stirred for about 1 hour to homogenize the isocyanate content.

At a temperature of 100° C. there were added successively 53.5 parts DYNASILANE 1110, (3-(N-methylamino)propyl)-dimethoxysilane, 250 parts of carbon black, dried at a temperature of 130° C., and 2.5 parts of NIAX D22 (dibutyltin dilaurate). The resultant mass is not stringy; rather, at the preparation temperature it is slightly tacky and does not sag. At room temperature, it is readily touchable and plastically moldable.

The following analytical data were obtained after a two weeks' storage of the mass at a temperature of 23° C. and 50% relative humidity:

| | | |
|---|---|---|
| Shore hardness A | 45 | (DIN 53505) |
| tensile strength [N/mm$^2$] | 5.8 | (DIN 53504) |
| breaking elongation [%] | 580 | (DIN 53504) |
| breaking stress [N/mm$^2$] | 5.8 | (DIN 53504) |
| further breaking strength [N/mm$^2$] | 9.4 | (DIN 53515) |
| open lying time of the beads | about ½ hour | |
| use temperature | −40° C. to +90° C. (temporarily up to +150° C.) | |

We claim:
1. Reactive hot-melt adhesive composition, comprising the following ingredients in admixture:
   at least one thermoplastic material having reactive silane groups; and
   at least one thixotropic agent.
2. Reactive hot-melt adhesive composition, comprising the following ingredients in admixture:
   at least one thermoplastic material devoid of reactive silane groups;
   at least one thixotropic agent; and
   at least one binder having reactive silane groups and devoid of reactive isocyanate groups.
3. Reactive hot-melt adhesive composition according to claim 1, wherein said at least one thermoplastic material is present in an amount ranging from 20 to 90 percent by weight, and said thixotropic agent is present in an amount ranging from 3 to 30 percent by weight.
4. Reactive hot-melt adhesive composition according to claim 3, wherein said at least one thermoplastic material is present in an amount ranging from 50 to 65 percent by weight, and said at least one thixotropic agent is present in an amount ranging from 8 to 20 percent by weight.
5. Reactive hot-melt adhesive composition according to claim 2, wherein said at least one thermoplastic material is present in an amount ranging from 20 to 90 percent by weight, said thixotropic agent is present in an amount ranging from 3 to 30 percent by weight, and said at least one binder is present in an amount ranging from 5 to 40 percent by weight.

6. Reactive hot-melt adhesive composition according to claim 5, wherein said at least one thermoplastic material is present in an amount ranging from 50 to 65 percent by weight, said at least one thixotropic agent is present in an amount ranging from 8 to 20 percent by weight, and said at least one binder is present in an amount ranging from 15 to 30 percent by weight.

7. Reactive hot-melt adhesive composition according to claim 1 or 2, wherein said at least one thixotropic agent is selected from the group consisting of bentonite, carbon black, silicic acid derivates, precipitated chalks, polyvinylchloride, urea derivatives and acrylate derivatives.

8. Reactive hot-melt adhesive composition according to claim 1 or 2, further comprising:
at least one plasticizer in an amount ranging from 2 to 30 percent by weight.

9. Reactive hot-melt adhesive composition according to claim 8, wherein said at least one plasticizer is present in an amount ranging from 5 to 10 percent by weight.

10. Reactive hot-melt adhesive composition according to claim 8, wherein said at least one plasticizer is selected from the group consisting of phthalates, alkyl-phosphates having up to 8 carbon atoms, epoxy-containing compounds, toluene-sulfonamides, chloroparaffins, adipic acid esters and castor oils.

11. Reactive hot-melt adhesive composition according to claim 10, wherein said phthalates are selected from the group consisting of dibutylphthalate, dioctylphthalate, dicyclohexylphthalate, diisooctylphthalate, diisodecylphthalate, dibenzylphthalate and butylbenzylphthalate.

12. Reactive hot-melt adhesive composition according to claim 1 or 2, further comprising:
at least one filler in an amount ranging from 5 to 50 percent by weight.

13. Reactive hot-melt adhesive composition according to claim 12, wherein said at least one filler is present in an amount ranging from 8 to 15 percent by weight.

14. Reactive hot-melt adhesive composition according to claim 12, wherein said at least one filler is selected from the group consisting of silicic acid derivatives, gypsum, talc, active charcoal, metal powder, chalks, kaolins and carbon blacks.

15. Reactive hot-melt adhesive composition according to claim 1 or 2, further comprising:
at least one additive selected from the group consisting of adhesion promoters, dyes and pigments, polyurethane catalysts, UV-absorbing agents and stabilizers, flame retardants, fungistatic agents and bacteriostatic agents, said additive being present in an amount ranging from 0.001 to 5 percent by weight.

16. Reactive hot-melt adhesive composition according to claim 1, wherein said at least one thermoplastic material is a macromolecular material selected from the group consisting of polyamide resins, polyolefins, polyacrylates, polymethacrylates and polyurethane resins.

17. Reactive hot-melt adhesive composition according to claim 16, wherein said polyurethane resins are formed from the following components:
(A) at least one polyurethane prepolymer having reactive isocyanate groups, and
(B) at least one compound having silane groups which react with the isocyanato groups of the polyurethane prepolymer.

18. Reactive hot-melt adhesive composition according to claim 17, wherein said at least one polyurethane prepolymer is formed from components selected from the group consisting of:
(a) aromatic diisocyanates selected from the group consisting of diphenylmethane-4,4'-diisocyanate, toluene-2,4-diisocyanate, 1,5-naphthalene diisocyanate, 1,3- and 1,4-phenylene-diisocyanate, triphenylmethane-4,4',4"-triisocyanate, and polyphenyl-polymethylenepolyisocyanates;
(b) aliphatic or cycloaliphatic diisocyanates selected from the group consisting of hexamethylenediisocyanate, dodecane-1,12-diisocyanate, cyclobutane-1,3-diisocyanate, cyclohexane-1,3- and -1,4-diisocyanate, 1-isocyanato-3,3,5-trimethyl-5-isocyanatemethylcyclohexane, hexahydrotoluylene-2,4- and -2,6-diisocyanate, hexahydro-1,3- and -1,4-phenyldiisocyanate, perhydro-2,4'-diphenylmethane-diisocyanate and perhydro-4,4'-diphenylmethane-diisocyanate;
(c) polyols having a molecular weight ranging from 400 to 10,000 selected from the group consisting of
polybutadienes,
polycarbonates,
polycaprolactones,
polycaprolactams,
polyethers selected from the group consisting of polyethylene oxides, polypropylene oxides, polybutylene oxides, polystyrene oxides, polyepichlorohydrins and polytetrahydrofurans,
polyesters selected from the group consisting of condensation products of (1) polyhydric alcohols selected from the group consisting of ethylene glycol, 1,2- and 1,3-propylene glycol, 1,4- and 2,3-butylene glycol, 1,6-hexanediol, 1,8-octanediol, glycerin, trimethylol propane, pentaerythritol, chitin, mannitol and sorbitol, methylglycoside, diethylene glycol, polyethylene glycols, dipropylene glycol and polypropylene glycols with (2) carboxylic compounds selected from the group consisting of succinic acid, adipic acid, octanedioic acid, azelaic acid, sebacic acid, phthalic acid, isophthalic acid, trimellitic acid, phthalic acid anhydride, tetrahydrophthalic acid anhydride, tetrachlorophthalic acid anhydride, glutaric acid anhydride, maleic acid anhydride, fumaric acid, terephthalic acid dimethylester and terephthalic acid-bisglycol ester;
each of the above polyols having at least 2 OH-groups,
(d) short chain diols selected from the group consisting of ethylene glycol, propylene glycol, hexamethylene glycol, hexapropylene glycol, diethyleneglycol, and hexaethylene glycol; and
(e) cross-linking agents selected from the group consisting of trimethylolpropane, glycerin, hexanetriol, triethanolamine, sorbitol, mannitol, sucrose, ethyleneamine, ethanolamine, hexamethylene amine, and pentaerythritol.

19. Reactive hot-melt adhesive composition according to claim 18, wherein said at least one compound containing silane groups is selected from the group consisting of
(3-aminopropyl)methyldimethoxysilane,
(3-aminopropyl)methyldiethoxysilane,
(3-(N-aminoethyl)aminopropyl)methyldimethoxysilane,
(3-mercaptopropyl)methyldimethoxysilane, (3-mercaptopropyl)methyldiethoxysilane,
(3-aminopropyl)trimethoxysilane,
(3-aminopropyl)triethoxysilane,
(3-mercaptopropyl)-trimethoxysilane,
(3-mercaptopropyl)triethoxysilane,
(3-(N-methylamino)propyl)trimethoxysilane,
3-glycidoloxypropyl-trimethoxysilane; and
compounds containing silane groups and derived from ether interchange of the silane groups of the above mentioned alkoxysilanes with at least one compound mentioned as defined at items (c), (d) and (e) of claim 18.

20. Reactive hot-melt adhesive composition according to claim 17, wherein said components further comprise:
   (c) at least one chain extender.

21. Reactive hot-melt adhesive composition according to claim 20, wherein said at least one chain extender is selected from the group consisting of ethylene glycol, propylene glycol, hexamethylene glycol, hexapropylene glycol, diethylene glycol, hexaethylene glycol, N-methylethanolamine, N-ethylethanolamine, 2-mercaptoethanol, and sodium chloride complex of p,p-methylene-dianiline.

22. Reactive hot-melt adhesive composition according to claim 2, wherein said thermoplastic material is selected from the group consisting of polyamide resins, polyolefins, polyacrylates, polymethacrylates and polyurethane resins.

23. Reactive hot-melt adhesive composition according to claim 22, wherein said polyurethane resins are formed from components selected from the group consisting of:
   (a) aromatic diisocyanates selected from the group consisting of diphenylmethane-4,4'-diisocyanate, toluene-2,4-diisocyanate, 1,5-naphthalene diisocyanate, 1,3- and 1,4-phenylene-diisocyanate, triphenylmethane-4,4',4"-triisocyanate, and polyphenyl-polymethylenepolyisocyanates;
   (b) aliphatic or cycloaliphatic diisocyanates selected from the group consisting of hexamethylenediisocyanate, dedecane-1,12-diisocyanate, cyclobutane-1,3-diisocyanate, cyclohexane-1,3- and -1,4-diisocyanate, 1-isocyanato-3,3,5-trimethyl-5-isocyanatemethylcyclohexane, hexahydrotoluylene-2,4- and -2,6-diisocyanate, hexahydro-1,3- and -1,4-phenyldiisocyanate, perhydro-2,4'-diphenylmethane-diisocyanate and perhydro-4,4'-diphenylmethane-diisocyanate;
   (c) polyols having a molecular weight ranging from 400 to 10,000 selected from the group consisting of
   polybutadienes,
   polycarbonates,
   polycaprolactones,
   polycaprolactams,
   polyethers selected from the group consisting of polyethylene oxides, polypropylene oxides, polybutylene oxides, polystyrene oxides, polyepichlorohydrins and polytetrahydrofurans,
   polyesters selected from the group consisting of condensation products of (1) polyhydric alcohols selected from the group consisting of ethylene glycol, 1,2- and 1,3-propylene glycol, 1,4- and 2,3-butylene glycol, 1,6-hexanediol, 1,8-octanediol, glycerin, trimethylol propane, pentaerythritol, chitin, mannitol and sorbitol, methylglycoside, diethylene glycol, polyethylene glycols, dipropylene glycol and polypropylene glycols with (2) carboxylic compounds selected from the group consisting of succinic acid, adipic acid, octanedioic acid, azelaic acid, sebacic acid, phthalic acid, isophthalic acid, trimellitic acid, phthalic acid anhydride, tetrahydrophthalic acid anhydride, tetrachlorophthalic acid anhydride, glutaric acid anhydride, maleic acid anhydride, fumaric acid, terephthalic acid dimethylester and terephthalic acid-bisglycol ester;
   each of the above polyols having at least 2 OH-groups; and
   (d) short chain diols selected from the group consisting of ethylene glycol, propylene glycol, hexamethylene glycol, hexapropylene glycol, diethyleneglycol, and hexaethylene glycol.

24. Reactive hot-melt adhesive composition according to claim 2, wherein said at least one binder is formed from the following components:
   (A) at least one polyurethane prepolymer having reactive isocyanate groups, and
   (B) at least one compound having silane groups which react with the isocyanate groups of the polyurethane prepolymer.

25. Reactive hot-melt adhesive composition according to claim 24, wherein said at least one polyurethane prepolymer is formed from components selected from the group consisting of:
   (a) aromatic diisocyanates selected from the group consisting of diphenylmethane-4,4'-diisocyanate, toluene-2,4-diisocyanate, 1,5-naphthalene diisocyanate, 1,3- and 1,4-phenylene-diisocyanate, triphenylmethane-4,4',4"-triisocyanate, and polyphenyl-polymethylenepolyisocyanates;
   (b) aliphatic or cycloaliphatic diisocyanates selected from the group consisting of hexamethylenediisocyanate, dedecane-1,12-diisocyanate, cyclobutane-1,3-diisocyanate, cyclohexane-1,3- and -1,4-diisocyanate, 1-isocyanato-3,3,5-trimethyl-5-isocyanatemethylcyclohexane, hexahydrotoluylene-2,4-and -2,6-diisocyanate, hexahydro-1,3- and -1,4-phenyldiisocyanate, perhydro-2,4'-diphenylmethane-diisocyanate and perhydro-4,4'-diphenylmethane-diisocyanate;
   (c) polyols having a molecular weight ranging from 400 to 10,000 selected from the group consisting of
   polybutadienes,
   polycarbonates,
   polycaprolactones,
   polycaprolactams,
   polyethers selected from the group consisting of polyethylene oxides, polypropylene oxides, polybutylene oxides, polystyrene oxides, polyepichlorohydrins and polytetrahydrofurans,
   polyesters selected from the group consisting of condensation products of (1) polyhydric alcohols selected from the group consisting of ethylene glycol, 1,2- and 1,3-propylene glycol, 1,4- and 2,3-butylene glycol, 1,6-hexanediol, 1,8-octanediol, glycerin, trimethylol propane, pentaerythritol, chitin, mannitol and sorbitol, methylglycoside, diethylene glycol, polyethylene glycols, dipropylene glycol and polypropylene glycols with (2) carboxylic compounds selected from the group consisting of succinic acid, adipic acid, octanedioic acid, azelaic acid, sebacic acid, phthalic acid, isophthalic acid, trimellitic acid, phthalic acid anhydride, tetrahydrophthalic acid anhydride, tetrachlorophthalic acid anhydride, glutaric acid anhydride, maleic acid anhydride, fumaric acid, terephthalic acid dimethylester and terephthalic acid-bisglycol ester;

each of the above polyols having at least 2 OH-groups, (d) short chain diols selected from the group consisting of ethylene glycol, propylene glycol, hexamethylene glycol, hexapropylene glycol, diethyleneglycol, and hexaethylene glycol; and (e) cross-linking agents selected from the group consisting of trimethylolpropane, glycerin, hexanetriol, triethanolamine, sorbitol, mannitol, sucrose, ethyleneamine, ethanolamine, hexamethylene amine, and pentaerythritol.

26. Reactive hot-melt adhesive composition according to claim 25, wherein said at least one compound containing silane groups is selected from the group consisting of (3-aminopropyl)methyldimethoxysilane,
(3-aminopropyl)methyldiethoxysilane,
(3-(N-aminoethyl)aminopropyl)methyldimethoxysilane,
(3-mercaptopropyl)methyldimethoxysilane,
(3-mercaptopropyl)methyldiethoxysilane,
(3-aminopropyl)trimethoxysilane,
(3-aminopropyl)triethoxysilane,
(3-mercaptopropyl-trimethoxysilane,
(3-mercaptopropyl)triethoxysilane,
(3-(N-methylamino)propyl)trimethoxysilane,
(3-glycidoloxypropyl-trimethoxysilane; and compounds containing silane groups and derived from ether interchange of the silane groups of the above mentioned alkoxysilanes with at least one compound mentioned as defined at items (c), (d) and (e) of claim 25.

27. Process for making a reactive hot-melt adhesive composition, comprising homogeneously admixing, in the absence of water and humidity, (i) a thermoplastic material having reactive silane groups and heated to its softening point, and (ii) a thixotropic agent.

28. Process for making a reactive hot-melt adhesive composition, comprising homogeneously admixing, in the absence of water and humidity, (i) a thermoplastic material devoid of reactive silane groups and heated to its softening point, (ii) a thixotropic agent, and (iii) a binder having reactive silane groups and devoid of reactive isocyanate groups.

29. Process for bonding articles, comprising extruding a reactive hot-melt adhesive according to claim 1 or 2 from a dispensing apparatus onto an article to be bonded near the softening point of said thermoplastic material.

30. Process for bonding articles, comprising applying at ambient temperature to an article to be bonded an extruded length of a hot-melt adhesive composition according to claim 1 or 2.

31. Process according to claim 30, wherein said extruded length has the shape of a cord or a ribbon and comprises a incorporated therein for imparting dimensional stability thereto.

* * * * *